United States Patent
Alam et al.

(10) Patent No.: US 8,606,196 B2
(45) Date of Patent: Dec. 10, 2013

(54) RECONFIGURABLE DIVERSITY RECEIVER

(75) Inventors: Mohammed Shah Alam, Chandler, AZ (US); Manish N. Shah, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 796 days.

(21) Appl. No.: 12/748,915

(22) Filed: Mar. 29, 2010

(65) Prior Publication Data

US 2011/0237211 A1 Sep. 29, 2011

(51) Int. Cl.
*H03C 7/02* (2006.01)
*H04B 1/02* (2006.01)
*H04B 7/02* (2006.01)

(52) U.S. Cl.
USPC ........ 455/101; 455/132; 455/133; 455/277.1; 375/347

(58) Field of Classification Search
USPC .............. 455/101, 130, 562.1, 132, 133–137, 455/273, 277.1, 303, 67.11, 553.1, 143, 455/269, 272, 280, 103, 168.1, 500, 552.1, 455/575.7, 107, 275; 375/347, 267, 349, 375/219, 228
See application file for complete search history.

(56) References Cited

U.S. PATENT DOCUMENTS

| | | | |
|---|---|---|---|
| 7,444,166 B2* | 10/2008 | Sahota ...................... | 455/553.1 |
| 8,160,648 B2* | 4/2012 | Ulupinar et al. ........... | 455/562.1 |
| 2007/0242784 A1* | 10/2007 | Sampson et al. ............. | 375/347 |
| 2008/0051134 A1 | 2/2008 | Brobston et al. ........... | 455/553.1 |
| 2008/0159373 A1* | 7/2008 | Taha et al. ..................... | 375/232 |
| 2010/0117824 A1* | 5/2010 | Beamish et al. ......... | 340/539.13 |
| 2010/0265995 A1* | 10/2010 | Botha et al. ................... | 375/148 |
| 2012/0057621 A1* | 3/2012 | Hong et al. ................... | 375/219 |

* cited by examiner

*Primary Examiner* — Pablo Tran
(74) *Attorney, Agent, or Firm* — Baker Botts LLP.

(57) ABSTRACT

A method may include reconfigurably enabling one of a first downconverter and a second converter and disabling the other the second downconverter, wherein the first downconverter and the second downconverter are integral to a receiver unit of as wireless communications terminal. The method may also include frequency downconverting received wireless communication signals by the enabled downconverter. The method may also include processing the downconverted wireless communication signals by a primary path if the first downconverter is enabled, and processing the downconverted wireless communication signals by a diversity path if the second downconverter is enabled.

10 Claims, 10 Drawing Sheets

RECONFIGURABLE DIVERSITY RECEIVER

TECHNICAL FIELD OF THE INVENTION

The present invention relates generally to wireless communication and, more particularly, to a reconfigurable wireless diversity receiver.

BACKGROUND

In a wireless communication system, a transmitter modulates data onto a radio frequency (RF) carrier signal to generate an RF modulated signal that is more suitable for transmission. The transmitter then transmits the RF modulated signal via a wireless channel to a receiver. The transmitted signal may reach the receiver via one or more propagation paths (e.g., a line-of-sight path and/or reflected paths). The characteristics of the propagation paths may vary over time due to various phenomena such as fading and multipath. Consequently, the transmitted signal may experience different channel conditions and may be received with different amplitudes and/or phases over time.

To provide diversity against deleterious path effects, multiple antennas may be used to receive the RF modulated signal. At least one propagation path typically exists between the transmit antenna and each of the receive antennas. If the propagation paths for different receive antennas are independent, which is generally true to at least an extent, then diversity increases and the received signal quality improves when multiple antennas are used to receive the RF modulated signal.

A multi-antenna receiver conventionally has one RF receiver processing path (or simply, "receive path") for each frequency band and each receive antenna. For example, if the multi-antenna receiver is designed to operate at two frequency bands (e.g., cellular and PCS bands), then it would normally have four receive paths for the two frequency bands for each of the two receive antennas. Each receive path includes various circuit blocks (e.g., amplifiers, filters, mixers, and so on) used to condition and process a received signal at a designated frequency band from an associated antenna. The circuit blocks are typically designed to meet various system requirements such as linearity, dynamic range, sensitivity, out-of-band rejection, and so on, as is known in the art. In conventional receiver designs, the receive path is often replicated for each frequency band of each of the receive antennas, with circuit modifications (as needed) for different frequency bands. The replication of the receive path circuitry results in higher cost, larger area, and higher power consumption for the multi-antenna receiver, all of which are undesirable. There is therefore a need in the art for a low-cost diversity receiver.

SUMMARY

In accordance with a particular embodiment of the present disclosure, a method may include reconfigurably enabling one of a first downconverter and a second converter and disabling the other the second downconverter, wherein the first downconverter and the second downconverter are integral to a receiver unit of as wireless communications terminal. The method may also include frequency downconverting received wireless communication signals by the enabled downconverter. The method may also include processing the downconverted wireless communication signals by a primary path if the first downconverter is enabled, and processing the downconverted wireless communication signals by a diversity path if the second downconverter is enabled.

In accordance with another particular embodiment of the present disclosure, a method may include frequency downconverting a first wireless communication signal by a first downconverter communicatively coupled to a primary path, the first downconverter integral to a first receiver unit of a wireless communications terminal and frequency downconverting a second wireless communication signal by a second downconverter communicatively coupled to a diversity path, the second downconverter integral to a second receiver unit of the wireless communications terminal. The method may further include configuring a switch to, when closed, communicatively couple an output of a second downconverter to the primary path, and, when open, isolate the output of the second downconverter from the primary path. The method may also include processing the downconverted first wireless communication signal by the primary path. The method may additionally include processing the downconverted second wireless communication signal by the diversity path if the switch is open, and processing the downconverted second wireless communication signal by the primary path if the switch is closed.

Technical advantages of one or more embodiments of the present invention may include a reconfigurable diversity receiver that requires less circuit area as compared to traditional approaches.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
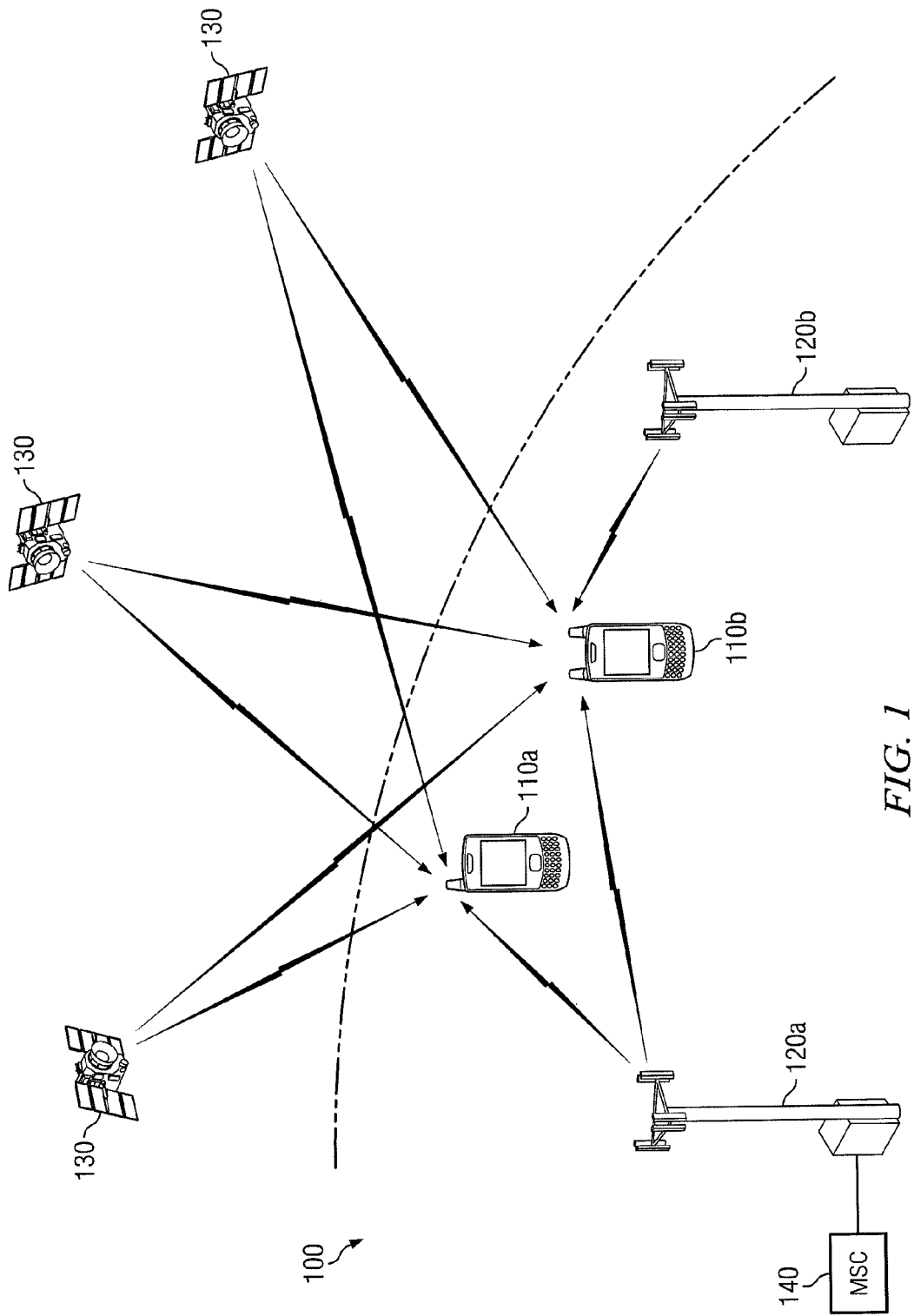
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. For simplicity, only two terminals 110a and 110b and two base stations 120a and 120b are shown in FIG. 1. A terminal 110 may also be referred to as a remote station, a mobile station, an access terminal, a user equipment (UE), a wireless communication device, a cellular phone, or some other terminology. Terminal 110a may be equipped with a single antenna, and terminal 110b may be equipped with two or more antennas. A base station 120 may be a fixed station and may also be referred to as an access point, a Node B, or some other terminology. A mobile switching center (MSC) 140 may be coupled to the base stations 120 and may provide coordination and control for base stations 120.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In general, a terminal may receive signals from zero, one, or multiple transmitting sources at any given moment. For multi-antenna terminal 110b, the signal from each transmitting source is received by each of the multiple antennas at the terminal, albeit at different amplitudes and/or phases.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2.

System 100 may operate on one or more specific frequency bands. Table 1 lists various example frequency bands in which system 100 may operate.

TABLE 1

| Frequency Band | Frequency Range |
| --- | --- |
| Personal Communication System (PCS) | 1850 to 1990 MHz |
| Cellular | 824 to 894 MHz |
| Digital Cellular System (DCS) | 1710 to 1880 MHz |
| GSM900 | 890 to 960 MHz |
| International Mobile Telecommunications - 2000 | 1920 to 2170 MHz |
| CDMA450 | 411 to 493 MHz |
| JCDMA | 832 to 925 MHz |
| KPCS | 1750 to 1870 MHz |
| GPS | 1574.4 to 1576.4 MHz |

The PCS band may also be known as GSM1900, the DCS band may also be known as GSM1800, and the cellular band may also be known as an Advanced Mobile Phone System (AMPS) band. System 100 may also operate on a frequency band that is not listed in Table 1.

For each of the frequency bands listed in Table 1, one frequency range may be used for the forward link (i.e., downlink) from the base stations to the terminals, and another frequency range may be used for the reverse link (i.e., uplink) from the terminals to the base stations. As an example, for the cellular band, the 824 to 849 MHz range may be used for the reverse link, and the 869 to 894 MHz range may be used for the forward link.

A terminal may be a single-band terminal or a multi-band terminal. A single-band terminal (e.g., terminal 110a) supports operation on one specific frequency band (e.g., cellular or PCS). A multi-band terminal (e.g., terminal 110b) supports operation on multiple frequency bands (e.g., cellular and PCS) and typically operates on one of the supported bands at any given moment. A multi-band terminal can communicate with different wireless communication systems operating on different frequency bands.

Figure 2A:
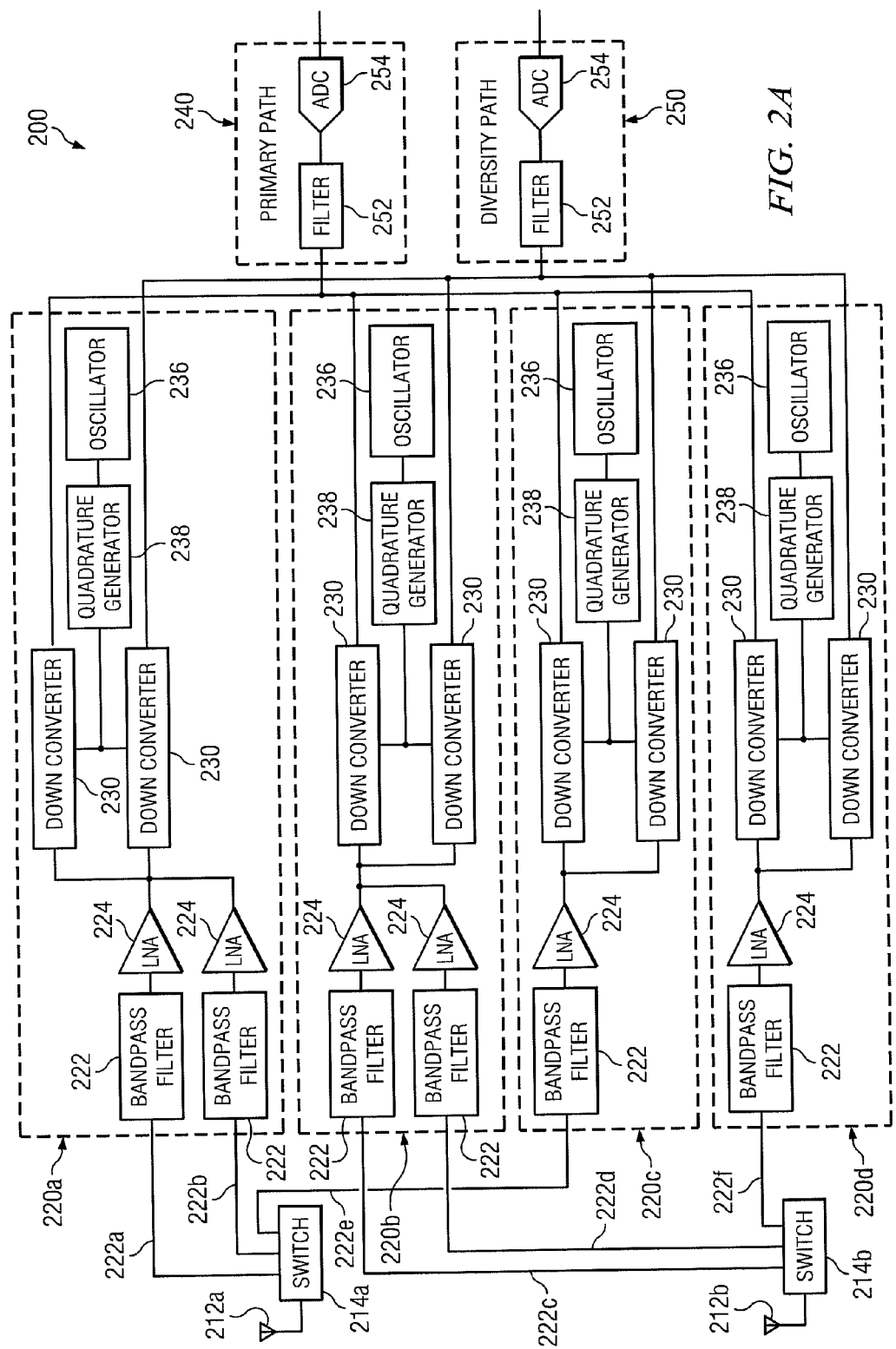
FIG. 2A illustrates a block diagram of an example terminal having reconfigurable receiver diversity, in accordance with certain embodiments of the present disclosure.

FIG. 2A illustrates a block diagram of an example terminal 200 having reconfigurable receiver diversity, in accordance with certain embodiments of the present disclosure. Terminal 200 may be used in a wireless communication system, such as system 100, for example (e.g., terminal 200 may be used as a multi-antenna terminal 110b in system 100). Although embodiments of the present disclosure may include any suitable number of antennae and receiver units, the embodiment depicted in FIG. 2A includes two antennae 212a and 212b coupled to four receiver units 220a-220d via antenna switches 214a and 214b. Antennae 212a and 212b may be formed in various manners at terminal 200 (e.g., with printed traces on a circuit board, wire conductors, and so on), as is known in the art. Each receiver unit 220 may process a received signal from one or more corresponding antennae 212 via an antenna switch 214 and provide a respective output baseband signal to either of a primary path 240 and a diversity path 250.

Each receiver unit 220 may include one or more bandpass filters configured to receive a signal from a corresponding switch 214 pass signal components in the band of interest and remove out-of-band noise and undesired signals. In addition, each receiver unit 220 may include one or more low-noise amplifiers (LNAs) 224 to amplify a signal received via a corresponding antenna 212. Some receiver units 220 (e.g., receiver units 220a and 220b) may include two or more ports 221 (e.g., bandpass filter 222/LNA 224 combinations), and thus may receive signals via two or more bands. Other receiver units 220 (e.g., receiver units 220c and 220d) may include a single port, thus enabling receipt of signals via a single band. Each receiver unit 220 may also include at least two downconverters 230: one downconverter 230 associated with primary path 240, one downconverter 230 associated with diversity path 250. Each downconverter 230 may be configured to frequency downconvert a wireless communication signal (e.g., a wireless communication signal received via an associated antennae 212 and amplified by associated LNAs 224) by an oscillator signal provided by an oscillator 236 and/or a quadrature signal provided by quadrature generator 238. Oscillator 236 may be any suitable device, system, or apparatus configured to produce an analog waveform of a particular frequency for demodulation or downconversion of a wireless communication signal amplified by an LNA 224. Quadrature generator 238 may be may be any suitable device, system, or apparatus configured to produce in-phase and quadrature signals for a downconverter 230 based on the received oscillator 236 signal. In operation, one of the two downconverters 230 of a receiver unit may be enabled such that a receiver unit 220 passes a downconverted signal to either primary path 240 or diversity path 250.

Each of primary path 240 and diversity path 250 may include a filter 252 and an analog-to-digital converter (ADC) 254. Each filter 252 may be configured to filter a downconverted wireless communication signal in order to pass the signal components within a radio-frequency channel of interest and/or to remove noise and undesired signals that may be generated by the downconversion process. Each ADC 254 may be receive an analog signal from an associated filter 252 and convert such analog signal into a digital signal. Such digital signal may then be passed to one or more other components of terminal 200.

In some embodiments, primary path 240 may be configured to support numerous wireless communications bands (e.g., 2G, 3G, and 4G technologies), while diversity path 250 may be configured to support a subset of such bands (e.g., may not include support for 2 G communications technologies, but may include support for 3G and 4G technologies), thus allowing diversity path 250 to require less space (e.g., less circuit area) than if full support was present. In such embodiments, each port 221 and receiver 220 of terminal 200 may be able to support all of the bands supported by primary path 240. This may permit reconfigurable diversity for terminal 200 while requiring less circuitry than traditional approaches to receiver diversity.

Figure 2B:
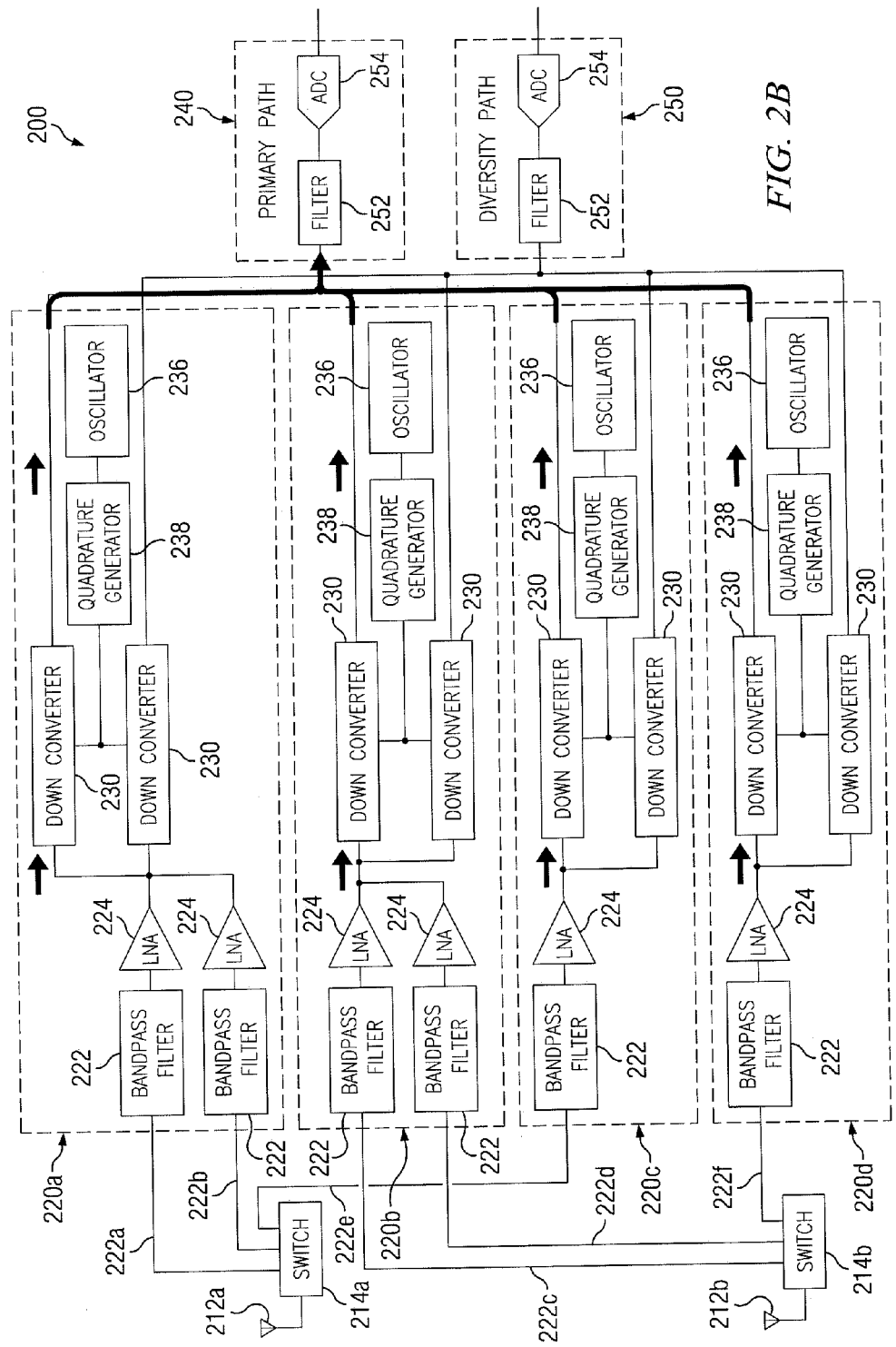
FIGS. 2B-2D each illustrate signal paths for various operational modes of the example terminal depicted in FIG. 2A.
Figure 2C:
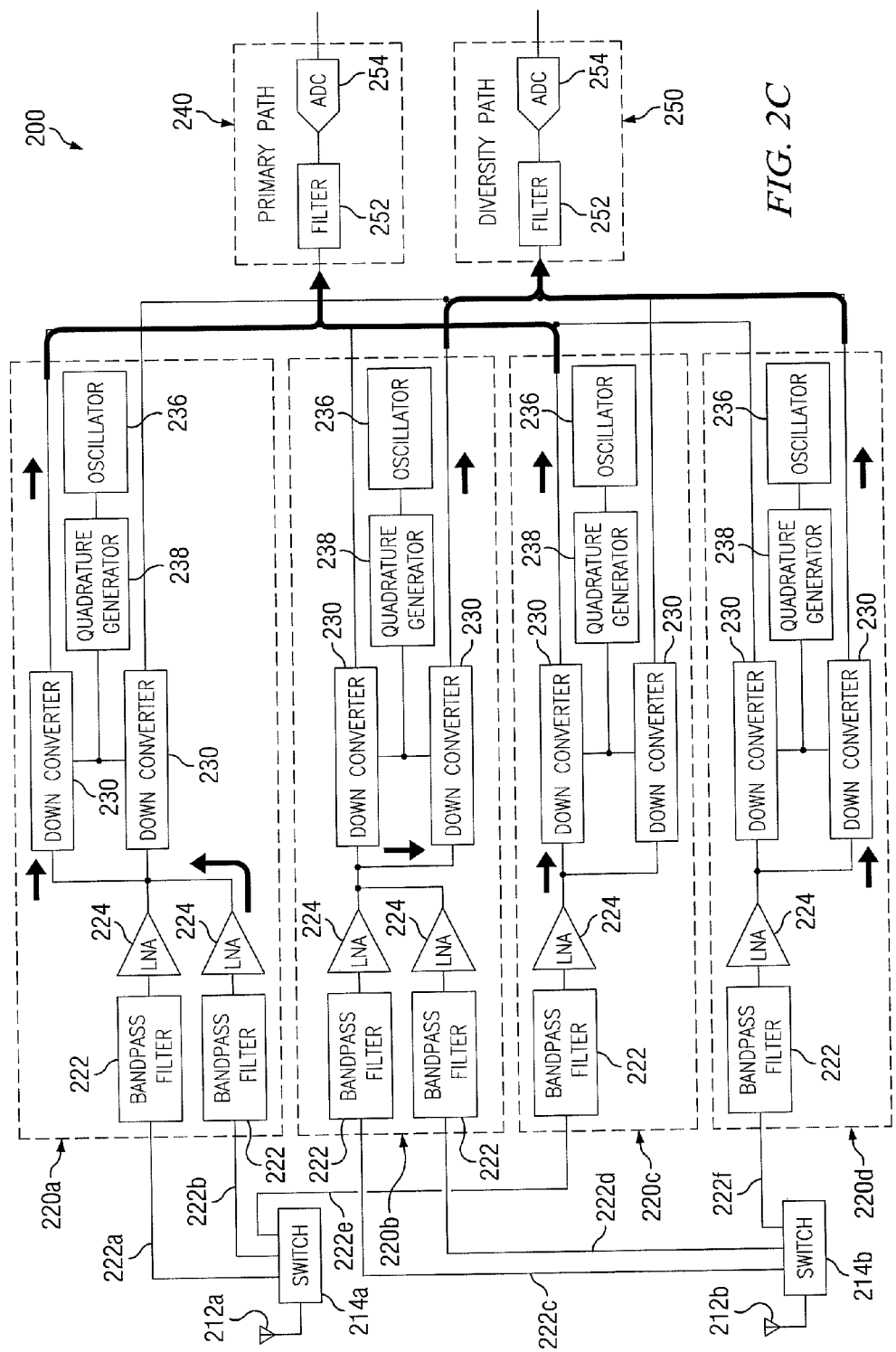
Figure 2D:
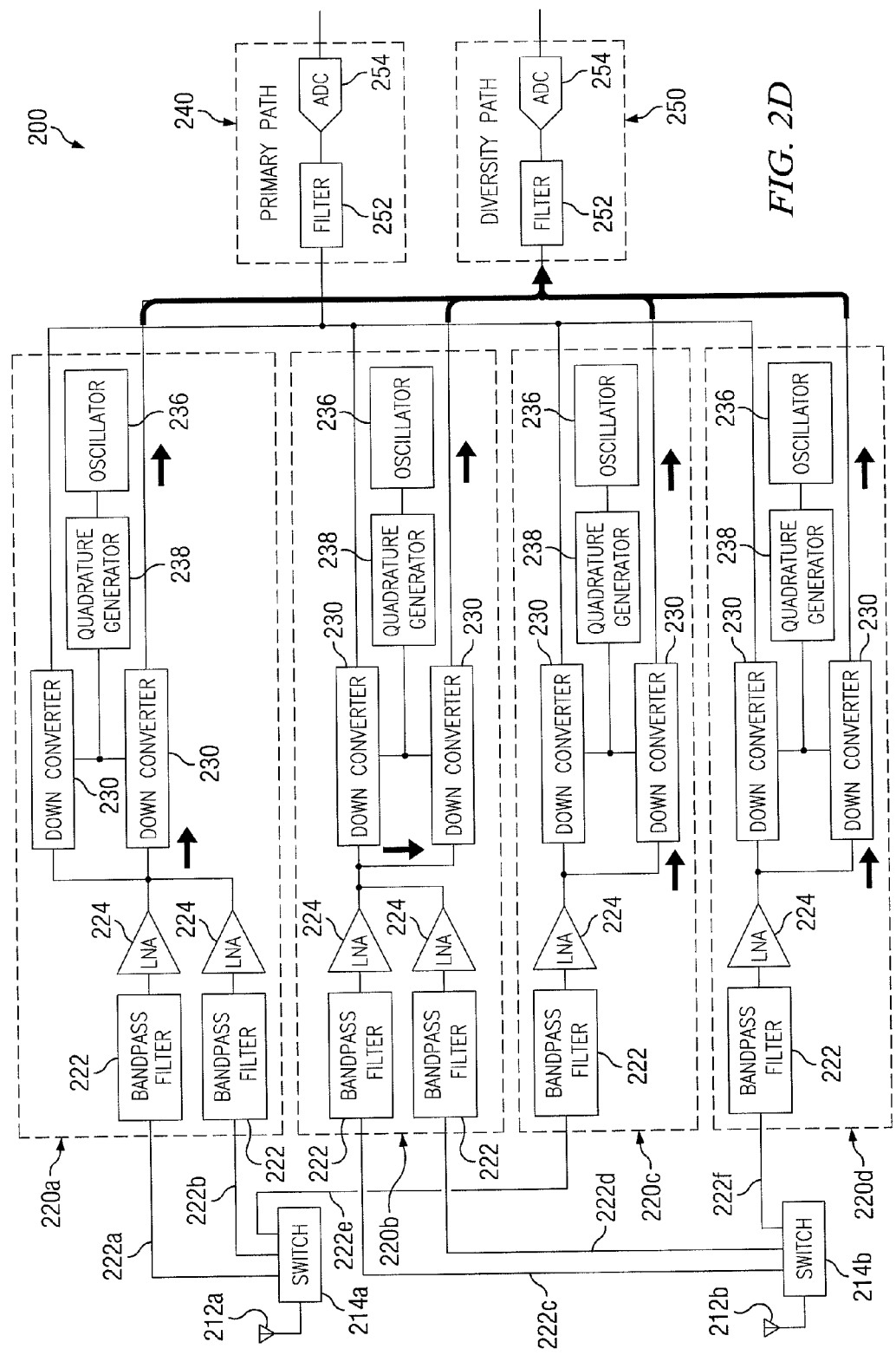

FIGS. 2B-2D each illustrate signal paths for various operational modes of example terminal 200 depicted in FIG. 2A. For example, arrows in FIG. 2B illustrate signal paths for when terminal 200 is in non-diversity mode. In such mode, all signals received in any communication band flow to primary path 240 without diversity. As another example, in diversity mode, terminal 200 may be configured such that signals received by some of receivers 220 are routed to diversity path 250, while other signals are routed to primary path 240, providing for receiver diversity, as shown in FIG. 2C. In FIG. 2D, terminal 200 is depicted in non-diversity mode with a secondary port routed to primary path 240.

FIG. 3 illustrates a block diagram of another example terminal 300 having reconfigurable receiver diversity, in accordance with certain embodiments of the present disclosure. Example terminal 300 may be similar to example terminal 200 except that its architecture is different. As in example terminal 200, terminal 300 may be used in a wireless communication system, such as system 100, for example (e.g., terminal 300 may be used as a multi-antenna terminal 110*b* in system 100). Although embodiments of the present disclosure may include any suitable number of antennae and receiver units, the embodiment depicted in FIG. 3 includes two antennae 212*a* and 212*b* coupled to four receiver units 220*f*-220*i*. Antennae 212*a* and 212*b* may be formed in various manners at terminal 300 (e.g., with printed traces on a circuit board, wire conductors, and so on), as is known in the art. A receiver unit 220 may process a received signal from one or more corresponding antennae 212 and provide a respective output baseband signal to either of a primary path 240 and a diversity path 250.

Each receiver unit 220 may include one or more low-noise amplifiers (LNAs) 224 to amplify a signal received via a corresponding antenna 212. Some receiver units 220 (e.g., receiver units 220*f* and 220*h*) may include two or more ports 221 (e.g., baseband filter 222/LNA 224 combinations), and thus may receive signals via two or more bands. Other receiver units 220 (e.g., receiver units 220*g* and 220*i*) may include a single port 221, thus enabling receipt of signals via a single band. Each receiver unit 220 may also include a downconverter 230 and oscillator 236, and such downconverter 230 and oscillator 236 may have functionality and/or design identical or similar to the downconverters 230 and oscillators 236 of terminal 200, as described above with respect to FIG. 2A.

Each of primary path 240 and diversity path 250 of terminal 300 may have functionality and/or design identical or similar to primary path 240 and diversity path 250 of terminal 200, as described above with respect to FIG. 2A. As in terminal 200, in some embodiments of terminal 300, primary path 240 may be configured to support numerous wireless communications bands (e.g., 2G, 3G, and 4G technologies), while diversity path 250 may be configured to support a subset of such bands (e.g., may not include support for 2 G communications technologies, but may include support for 3G and 4G technologies), thus allowing diversity path 250 to require less space (e.g., less circuit area) than if full support was present. In such embodiments, each port 221 and receiver 220 of terminal 300 may be able to support all of the bands supported by primary path 240. This may permit reconfigurable diversity for terminal 200 while requiring less circuitry than traditional approaches to receiver diversity.

Terminal 300 may also include switch 310. Switch 310 may be configured to be open when diversity is enabled, and closed when diversity is disabled. Accordingly, when open, switch 310 may permit signals received on ports 221*a*, 221*b*, and 221*e* and conditioned by receiver units 220*f* and 220*g* to be passed to primary path 240, while permitting signals received on antennae 221*c*, 221*d*, and 221*f* and conditioned by receiver units 220*h* and 220*i* to be passed to diversity path 250. On the other hand, when closed, switch may permit all signals received on ports 221 and conditioned by receiver units 220 to be passed to primary path 240.

Figure 3A:
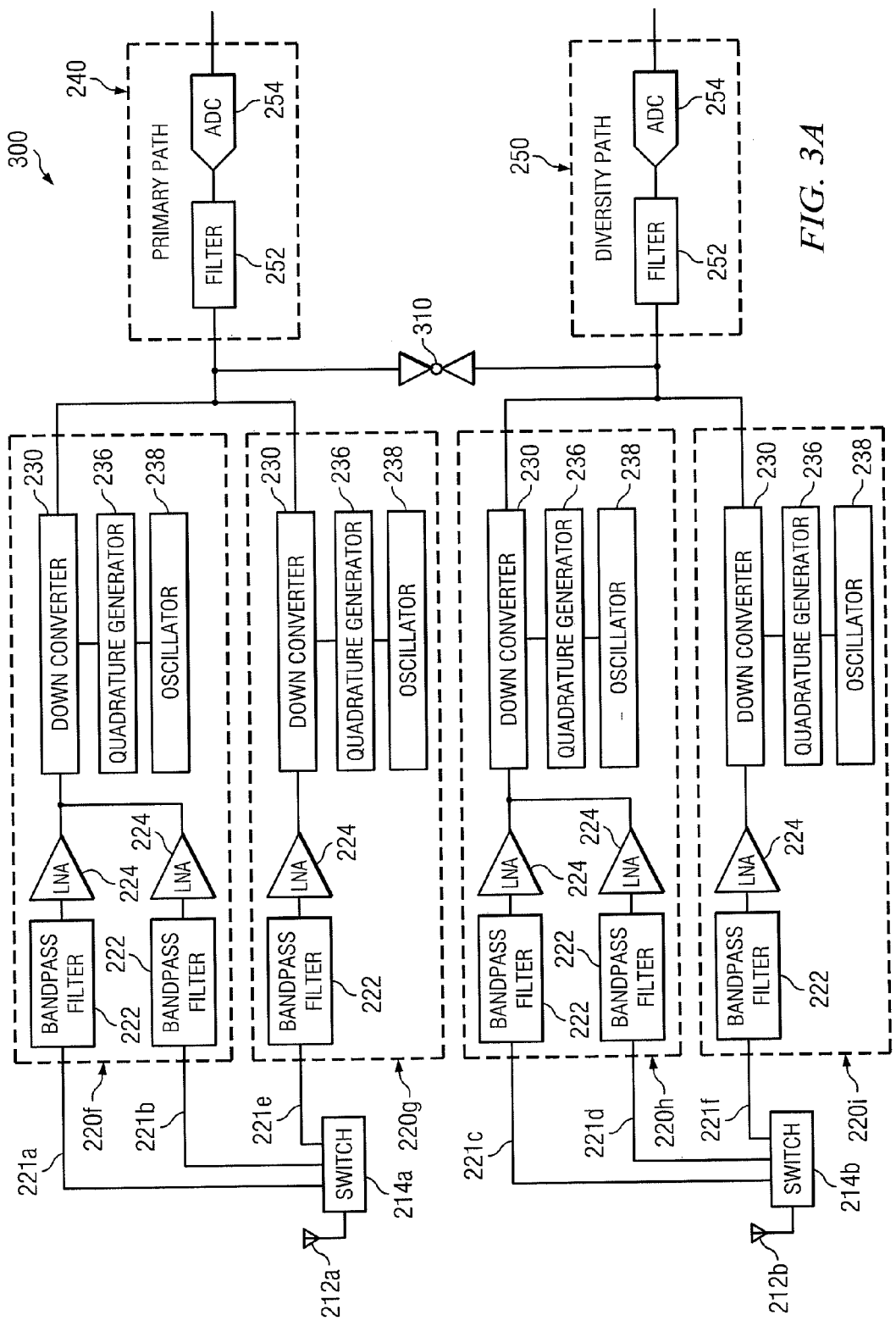
FIG. 3A illustrates a block diagram of another example terminal having reconfigurable receiver diversity, in accordance with certain embodiments of the present disclosure.
Figure 3B:
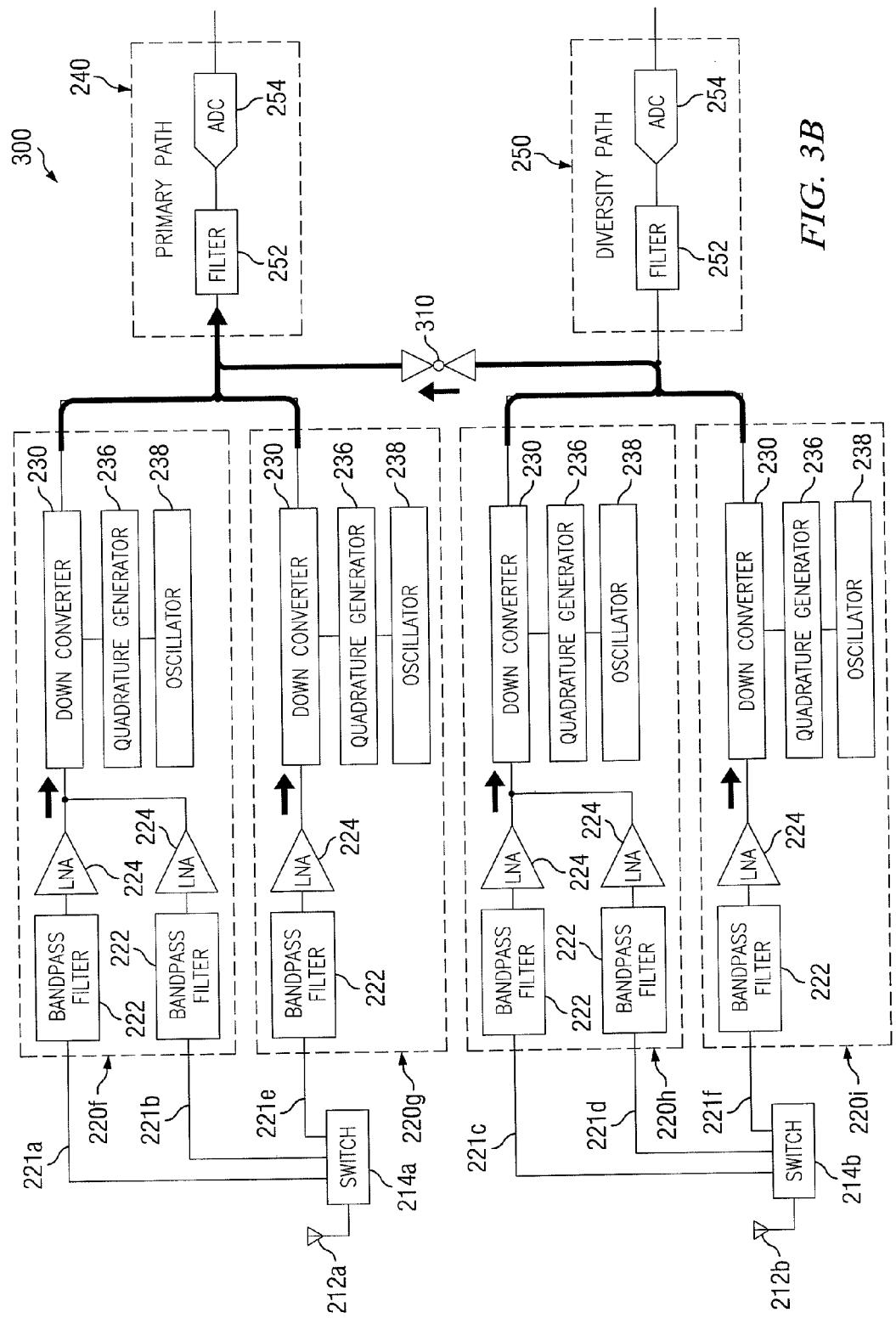
FIGS. 3B-3D each illustrate signal paths for various operational modes of the example terminal depicted in FIG. 3A.
Figure 3C:
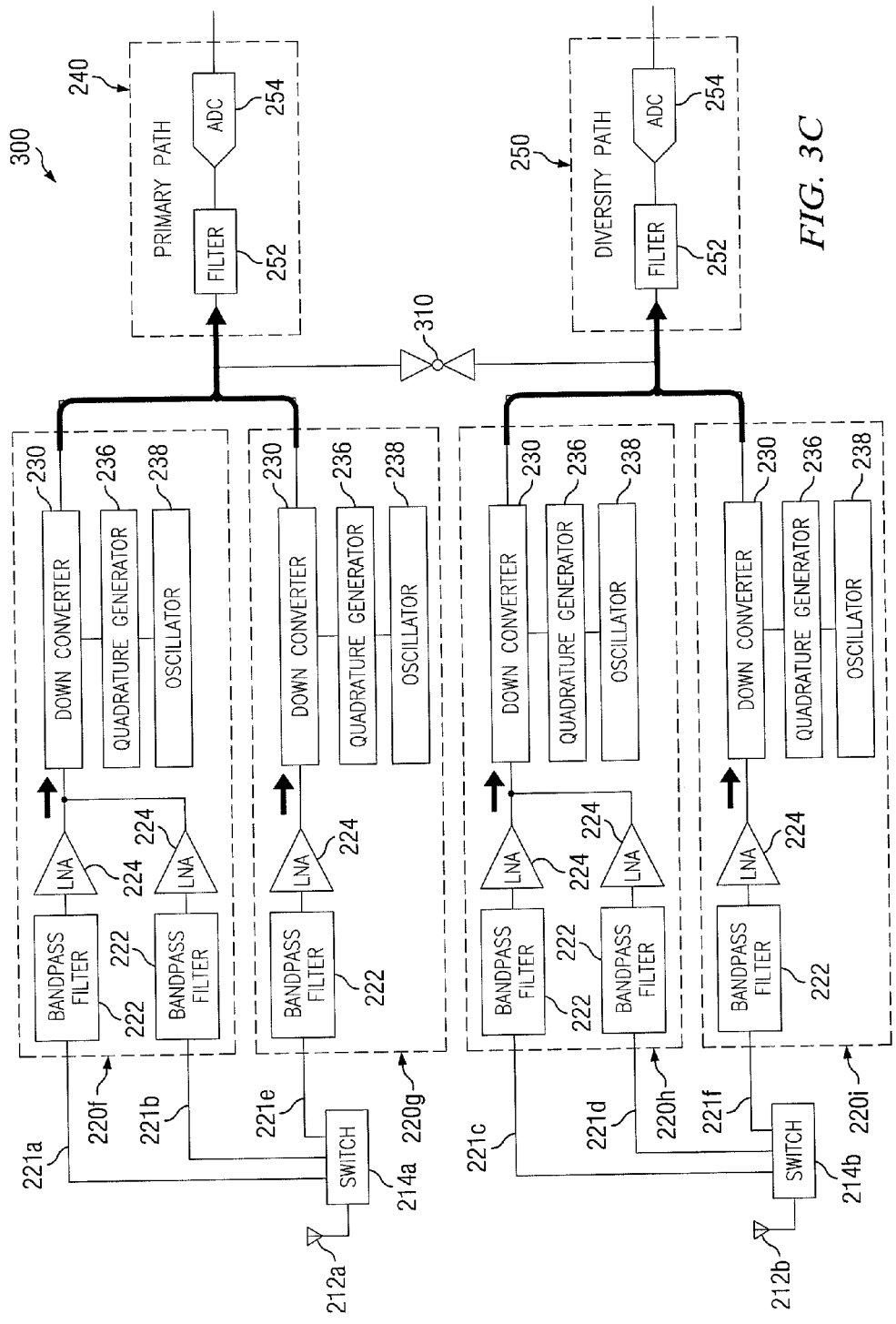
Figure 3D:
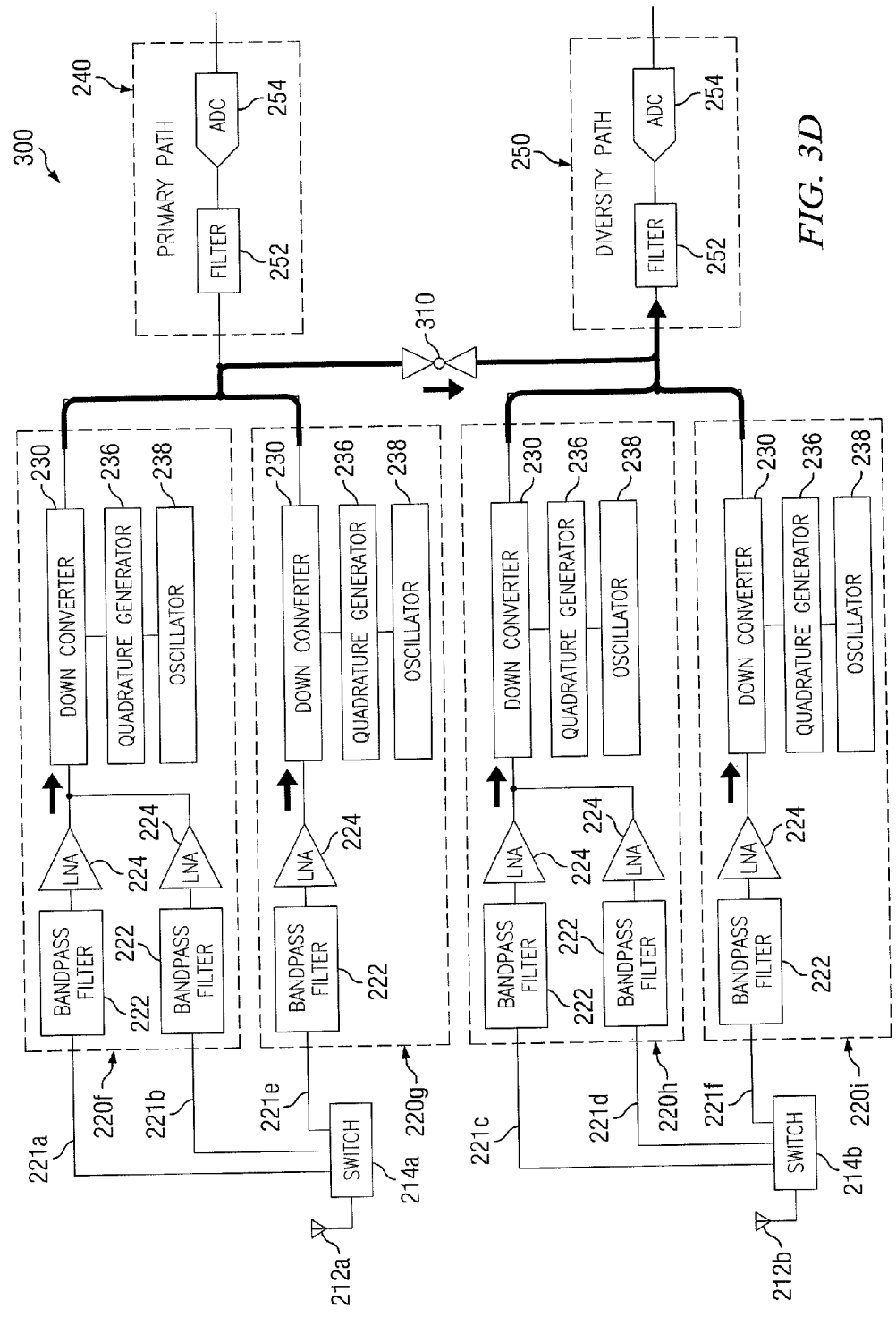

FIGS. 3B-3D each illustrate signal paths for various operational modes of example terminal 300 depicted in FIG. 3A. For example, arrows in FIG. 3B illustrate signal paths for when terminal 300 is in non-diversity mode. In such mode, all signals received in any communication band flow to primary path 240 without diversity. As another example, in diversity mode, terminal 300 may be configured such that signals received by some of receivers 220 are routed to diversity path 250, while other signals are routed to primary path 240, providing for receiver diversity, as shown in FIG. 3C. In FIG. 3D, terminal 300 is depicted in non-diversity mode with a secondary port routed to primary path 240.

To further illustrate potential advantages of the reconfigurable receiver diversity provided by the present disclosure, reference is made to Table 2, which depicts three non-limiting examples of configurations of bands assigned to various antennae/ports of a terminal (e.g. terminal 200, terminal 300).

TABLE 2

| Port | Configuration 1 | Configuration 2 | Configuration 3 |
|------|-----------------|-----------------|-----------------|
| 221a | Band 4 Primary | Band 4 Primary | Band 4 Primary |
| 221b | Band 2 Primary | Band 2/PCS | Band 2/PCS |
| 221c | Band 4 Diversity | Band 3/DCS | Band 3/DCS |
| 221d | Band 2 Diversity/PCS | Band 4 Diversity | Band 4 Diversity |
| 221e | Band 5 Primary | Band 5/GSM850 | Band 5 |
| 221f | Band 5 Diversity/GSM850 | Band VIII/EGSM | Band 5 Diversity/GSM850 |

To further illustrate certain advantages of the present disclosure, reference is made to Table 3, which depicts how analogous configurations to those set forth in Table 2 might be realized using traditional approaches.

TABLE 3

| Port | Configuration 1 | Configuration 2 | Configuration 3 |
|------|-----------------|-----------------|-----------------|
| 221a | Band 4 Primary | Band 4 Primary | Band 4 Primary |
| 221b | Band 2 Primary | Band 2/PCS | Band 2/PCS |
| 221c | Band 4 Diversity | Band 3 | Band 3 |
| 221d | Band 2 Diversity/PCS | Band 4 Diversity | Band 4 Diversity |
| 221e | Band 5 Primary | Band 5/GSM850 | Band 5 |

TABLE 3-continued

| Port | Configuration 1 | Configuration 2 | Configuration 3 |
|---|---|---|---|
| 221f | Band 5 Diversity/ GSM850 | Band VIII | Band 5 Diversity |
| Additional Port 1 | | DCS | DCS |
| Additional Port 2 | | ESGM | GSM850 |

As is evident from Table 2 and Table 3, traditional approaches would require the addition of ports or for diversity path 250 to support all of the wireless technologies supported by primary path 240, thus meaning that traditional approaches may require more circuit area as compared to the methods and systems disclosed herein.

Figure 4:
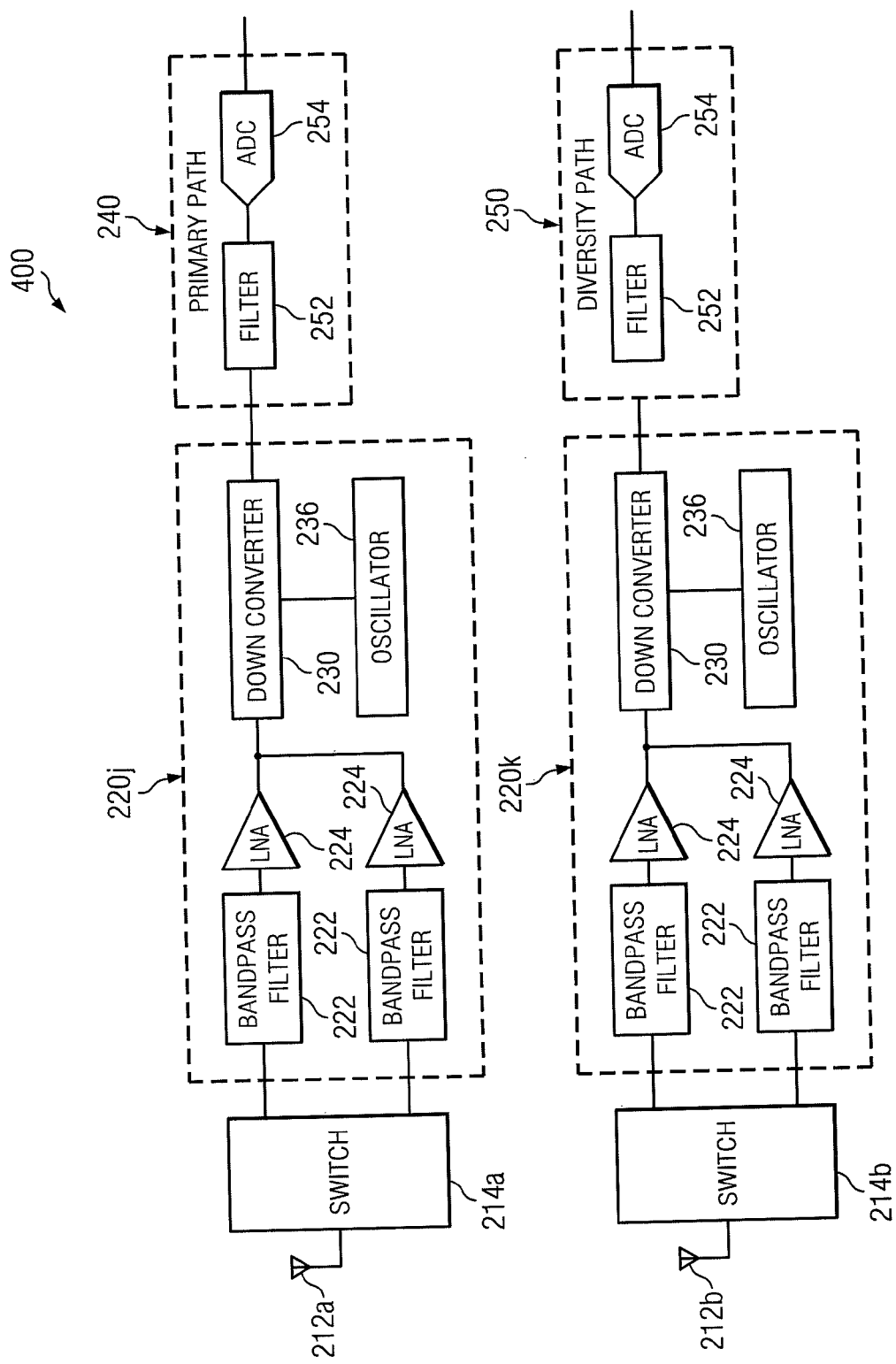
FIG. 4 illustrates a block diagram of an example terminal having receiver diversity, as is known in the art.

The advantages of the present disclosure can also be illustrated by comparing FIGS. 2 and 3 to FIG. 4. FIG. 4 illustrates a block diagram of an example terminal 400 having receiver diversity, as is known in the art. As seen in FIG. 4, traditional approaches employ receivers (e.g., 220j and 220k) each dedicated to one of the primary path 240 and diversity path 250. Accordingly, diversity path receivers cannot be reconfigured to pass signals to primary path 240, thus providing less configuration flexibility than that provided by the present disclosure.

Modifications, additions, or omissions may be made to system 100, terminal 200, and/or terminal 300 from the scope of the disclosure. Embodiments other than those depicted in FIGS. 1-3D may also be utilized. The components of system 100, terminal 200, and/or terminal 300 may be integrated or separated. Moreover, the operations of system 100, terminal 200, and/or terminal 300 may be performed by more, fewer, or other components. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A terminal, comprising:
a primary path for processing downconverted wireless communication signals;
a diversity path for processing downconverted wireless communication signals; and
at least one first receiver unit comprising a first downconverter having its output communicatively coupled to the primary path, the first downconverter configured to frequency downconvert received wireless communication signals;
at least one second receiver unit comprising a second downconverter having its output communicatively coupled to the diversity path, the second downconverter configured to frequency downconvert received wireless communication signals;
a switch coupled to the output of the second downconverter configured to, when closed, communicatively couple the output of the second downconverter to the primary path, and, when open, isolate the output of the second downconverter from the primary path; and
a plurality of ports communicatively coupled to each of the first downconverter and the second downconverter, each of the plurality of ports configured to receive the wireless communication signals.

2. A terminal according to claim 1, wherein:
the primary path is configured to support a plurality of wireless communications bands; and
the diversity path is configured to support a subset of the plurality of wireless communications bands.

3. A terminal according to claim 2, wherein each of the plurality of ports is configured to support the plurality of wireless communications bands supported by the primary path.

4. A terminal according to claim 2, wherein:
the primary path supports wireless communications bands compatible with 2G technologies; and
the diversity path does not support wireless communications bands compatible with 2G technologies.

5. A terminal according to claim 1, wherein the primary path comprises greater circuit area than the diversity path.

6. A method, comprising:
frequency downconverting a first wireless communication signal by a first downconverter communicatively coupled to a primary path, the first downconverter integral to a first receiver unit of a wireless communications terminal;
frequency downconverting a second wireless communication signal by a second downconverter communicatively coupled to a diversity path, the second downconverter integral to a second receiver unit of the wireless communications terminal;
configuring a switch coupled to an output of the second downconverter to, when closed, communicatively couple the output of the second downconverter to the primary path, and, when open, isolate the output of the second downconverter from the primary path;
processing the downconverted first wireless communication signal by the primary path;
processing the downconverted second wireless communication signal by the diversity path if the switch is open; and
processing the downconverted second wireless communication signal by the primary path if the switch is closed.

7. A method according to claim 6, further comprising:
configuring the primary path to support a plurality of wireless communications bands; and
configuring the diversity path to support a subset of the plurality of wireless communications bands.

8. A method according to claim 7, further comprising configuring each of the plurality of ports to support the plurality of wireless communications bands supported by the primary path.

9. A method according to claim 7, further comprising:
configuring the primary path to support wireless communications bands compatible with 2G technologies; and
configuring the diversity path to not support wireless communications bands compatible with 2G technologies.

10. A method according to claim 6, wherein the primary path comprises greater circuit area than the diversity path.

* * * * *